United States Patent [19]
Dienes

[11] 3,946,480
[45] Mar. 30, 1976

[54] APPARATUS FOR USE IN APPLYING AN EXPANDABLE RESILIENT SLEEVE TO A MEMBER THEREIN

[75] Inventor: Zoltan B. Dienes, Tarzana, Calif.

[73] Assignee: Communications Technology Corporation, Los Angeles, Calif.

[22] Filed: Apr. 11, 1975

[21] Appl. No.: 567,236

[52] U.S. Cl. .............. 29/235; 29/203 C; 29/203 H; 29/450; 29/628
[51] Int. Cl.² ......................................... B23P 19/02
[58] Field of Search ......... 29/235, 280, 282, 203 D, 29/203 C, 203 H, 203 HM, 450, 628

[56] References Cited
UNITED STATES PATENTS

| | | | |
|---|---|---|---|
| 1,669,053 | 5/1928 | Hamel | 29/235 |
| 3,515,798 | 6/1970 | Sievert | 29/235 |

*Primary Examiner*—Carl E. Hall
*Attorney, Agent, or Firm*—Harris, Kern, Wallen & Tinsley

[57] ABSTRACT

A device for maintaining a laterally expanded elastomeric sleeve, or the like, in a laterally expanded condition, and for progressively permitting the sleeve to contract onto a member within the sleeve, such as a cable splice and the cable ends on opposite sides of the splice. The device comprises: a first, outer annulus positionable within the sleeve adjacent one end thereof; a second, inner annulus positionable within the sleeve at a location spaced longitudinally inwardly of the sleeve from the first-mentioned end thereof; laterally contractible longitudinal members carried by the first annulus and supported in a laterally expanded position by engagement thereof with the second annulus and positionable within the sleeve; the second annulus being movable toward the first to permit the longitudinal members to progressively contract laterally, thereby allowing the sleeve to progressively contract onto the member therewithin; and an actuator connected to the second annulus for displacing it longitudinally toward the first.

7 Claims, 9 Drawing Figures

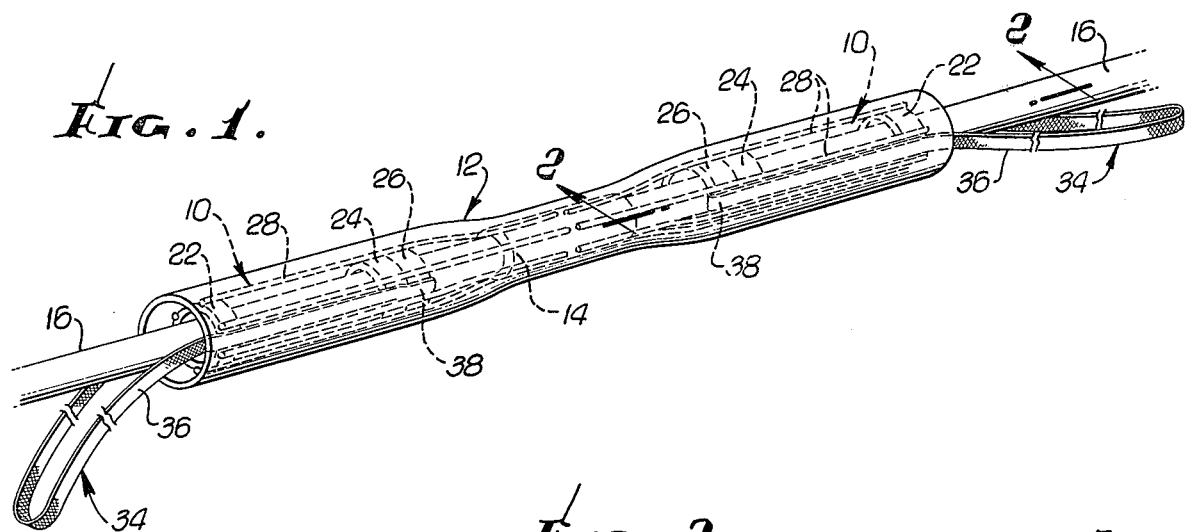
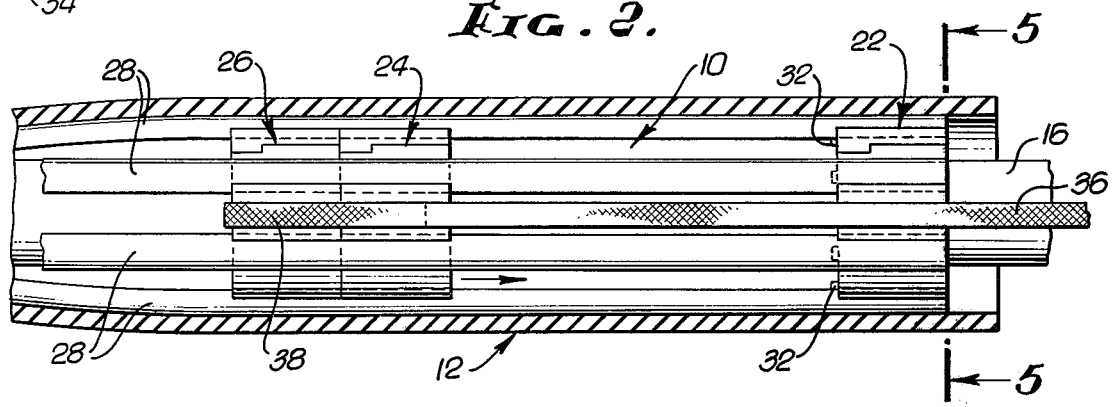
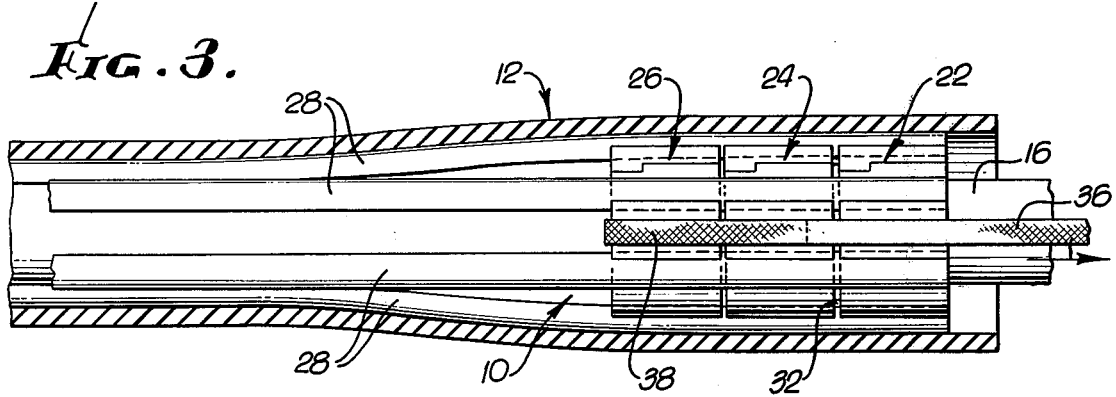
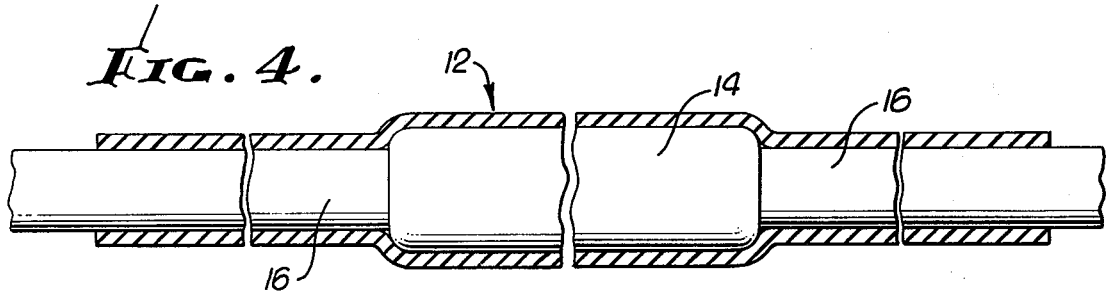

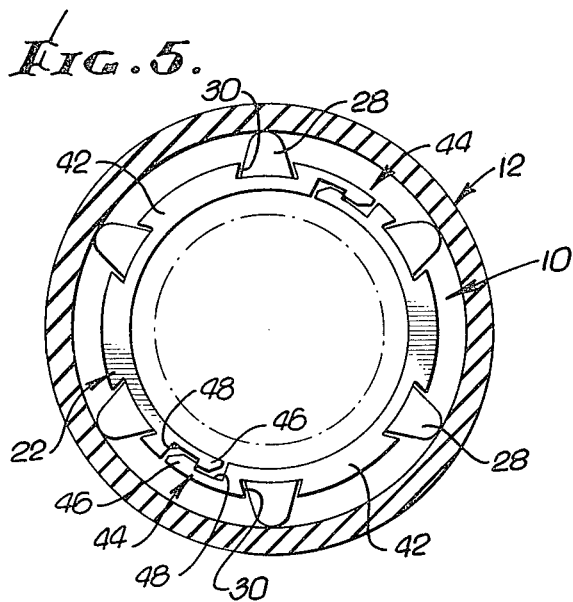
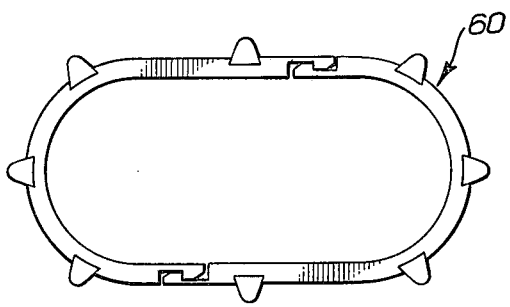
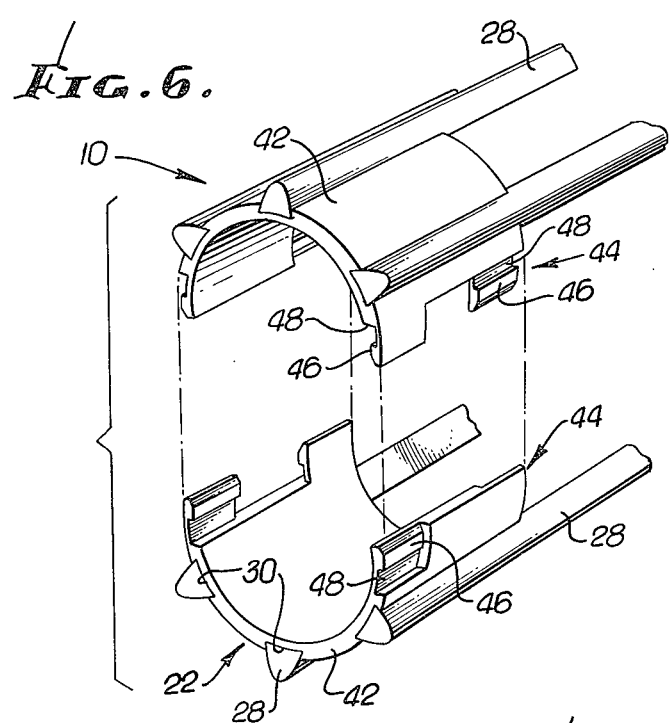
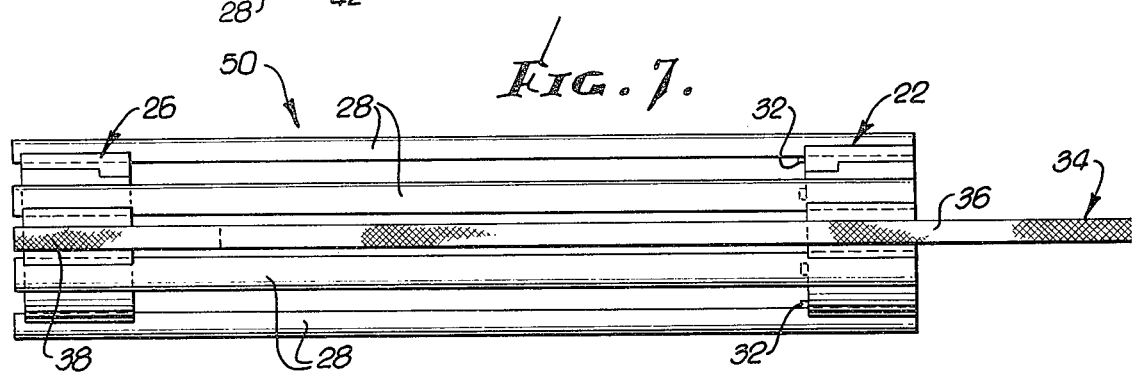

APPARATUS FOR USE IN APPLYING AN EXPANDABLE RESILIENT SLEEVE TO A MEMBER THEREIN

BACKGROUND OF THE INVENTION

The present invention relates in general to a device for maintaining a laterally expanded resilient sleeve, or the like, in a laterally expanded condition, and for progressively permitting the sleeve to contract onto a member extending into or through the sleeve.

A device of the foregoing nature may be utilized for the purpose of contracting an elastomeric sleeve onto a cable splice, and the adjacent cable ends, for the purpose of sealing the splice from the elements, suitable means being provided, if desired, for bonding the sleeve ends to the cable ends on opposite sides of the splice.

For convenience, the invention will be considered primarily herein in the foregoing environment. However, it will be understood that the invention may be utilized for various other, analogous purposes. For example, it may be used to progressively contact an expanded resilient coupling, elbow, tee, or the like, onto corresponding adjacent tubing ends. More generally, the invention has utility wherever it is desired to contract a resilient sleeve, or sleeve-like member, onto a member extending into or through the sleeve, or members extending into corresponding ends of the sleeve, or similar member.

As a further matter of convenience, the invention will be considered herein in connection with an elastomeric sleeve formed of rubber, or a rubber-like material, capable of being expanded laterally to a cross-sectional area several times its normal, or contracted, area. Merely as an example, in a cylindrical configuration, the elastomeric sleeve is preferably stretchable to a diameter of at least the order of twice its contracted, or normal, diameter. While, as indicated, the invention will be considered in connection with an elastomeric sleeve, it will be understood that the invention is applicable to any resilient tubular member capable of being expanded and subsequently contracted onto a member therein.

Objects and Summary of Invention

A general object of the present invention is to provide a very simple and effective device for maintaining a laterally expanded resilient sleeve, or other tubular member, in a laterally expanded condition in a positive manner, and for progressively permitting the sleeve to contract onto a member within the sleeve.

Another general object is to provide a device which can readily be withdrawn from between the sleeve, or other tubular member, and a member within the sleeve, as the sleeve is permitted to contract onto the member therewithin.

An important object of the invention is to provide a sleeve expander, or the like, which comprises simply two longitudinally spaced annuli carrying longitudinal members for holding the sleeve, or other tubular element, expanded, the sleeve being permitted to contract by displacing the longitudinally innermost annulus toward the longitudinally outermost annulus, and by subsequently withdrawing the device from between the sleeve and the member therewithin.

Still more particularly, the invention may be summarized as including, and another important object of the invention is to provide a sleeve expander which includes: a first, outer annulus positionable adjacent one end of the sleeve in alignment therewith; a second, inner annulus aligned with the first annulus and positionable relative to the sleeve at a location spaced inwardly of the sleeve with respect to the one end of the sleeve; laterally contractible longitudinal members carried by the first annulus and supported in a laterally expanded condition by engagement thereof with the second annulus and positionable within the sleeve; the second annulus being movable toward the first annulus to permit the longitudinal members to progressively contract laterally, thereby allowing the sleeve to progressively contract onto the member therewithin; and actuating means connected to the second annulus for displacing it longitudinally toward the first annulus.

Another object is to provide a sleeve expander which may have any desired transverse cross section, depending upon the cross section of the member upon which a sleeve, or other tubular element, is to be contracted. For example, the sleeve expander may be circular if the sleeve is to be contracted onto a member of circular cross section, may be oval for a member of "flat" cross section, may be square for a member of square cross section, and the like.

A further object is to provide a sleeve expander wherein each of the annuli is separable into at least two parts of facilitate removal of the expander from a member onto which the sleeve has been contracted, after removal of the expander from between the sleeve and the member therewithin.

Yet another object of the invention is to provide a device of the foregoing character wherein the actuating means, for moving the innermost annulus longitudinally toward the outermost, comprises simply a flexible loop connected at laterally opposite points to the innermost annulus.

Still another, and important, object of the invention is to provide a sleeve expander which may include three or more annuli supporting the longitudinal members for holding the sleeve expanded, all of the annuli except the outermost being longitudinally movable toward the outermost. With this construction, the actuating means is again connected to the innermost annulus, and is used to displace the innermost annulus into the engagement with the next movable annulus, whereupon the second movable annulus is displaced longitudinally into engagement with the third, and so forth, until the last movable annulus engages, or substantially engages, the outermost annulus. With such a construction, an expander for a sleeve of any desired length may be made in accordance with the invention.

An additional object is to provide a construction wherein the longitudinal members are disposed in and project laterally from external longitudinal grooves, or the equivalent, in the annuli, and wherein the longitudinal members are provided with stops abutting the outermost annulus to prevent movement of the longitudinal members relative to the outermost annulus as the innermost annulus, and any annuli therebetween, are displaced toward the outermost annulus. Another important feature is to provide a construction wherein the longitudinal members are readily removable from the annuli grooves, or the equivalent, which maintain them in their operative relationship with the annuli.

Thus, the present invention provides a very simple and effective sleeve expander which maintains a resilient sleeve, or other tubular element, in a laterally expanded condition, which progressively permits the sleeve to contract onto a member therewithin, which can readily be withdrawn from between the sleeve and the member therewithin, and which can readily be disassembled to permit removal thereof from the member onto which the sleeve has been contracted.

The resilient sleeve, upon application to a member therein, mechanically protects the member, electrically insulates it if a nonconductive sleeve is used, and also environmentally seals the internal member.

It will be understood that the sleeve is not permitted to shrink all the way to its unstressed size by the member to which it is applied, thus preserving a residual shrinkage tendency which causes the sleeve to cling tightly to the member.

It will be understood that the sleeve, or other tubular element, is moved into the desired position on the member onto which the sleeve is to be contracted, while the sleeve is held expanded by the device of the invention. It will also be understood that the sleeve, or the like, may be expanded initially by any suitable expanding means, the device of the invention being inserted into the initially expanded sleeve, after such initial expansion, thereof to ready it for use in the manner hereinbefore outlined.

Another feature of the invention is that the sleeve may be bonded to the member therewithin, upon contraction of the sleeve onto such member, by means of any suitable bonding agent or agents applied, before contraction of the sleeve, to the interior of the sleeve and/or the exterior of the member onto which the sleeve is to be contracted.

The foregoing objects, advantages, features and results of the present invention, together with various other objects, advantages, features and results thereof which will be evident to those skilled in the art to which the invention relates in the light of this disclosure, may be achieved with the exemplary embodiments of the invention illustrated in the accompanying drawings and described in detail hereinafter.

DESCRIPTION OF DRAWINGS

FIG. 1 is a perspective view showing two of the sleeve expanders of the invention in use to progressively contract an expanded sleeve of substantial length onto a cable splice, and onto the cables connected by the splice on opposite sides of the splice, each sleeve expander shown in FIG. 1 having three annuli two of which are longitudinally movable toward the third;

FIG. 2 is an enlarged, fragmentary longitudinal sectional view taken as indicated by the arrowed line 2—2 of FIG. 1;

FIG. 3 is a view similar to FIG. 2, but showing the two movable annuli of one of the sleeve expanders of FIG. 1 displaced longitudinally of the sleeve all the way to the third annulus;

FIG. 4 is a longitudinal sectional view showing the completed installation, with the sleeve contracted or shrunk onto the cable splice and onto the cables on opposite sides of the splice;

FIG. 5 is a transverse sectional view taken as indicated by the arrowed line 5—5 of FIG. 2 and showing the outer end of one of the sleeve expanders of FIG. 1 in end elevation, the expanded sleeve being shown as circular in cross section for convenience, although it may actually be somewhat distorted from circular;

FIG. 6 is a partially exploded perspective view showing a two-piece construction for the outermost annulus of one of the sleeve expanders of FIG. 1;

FIG. 7 is a side elevational view of an alternative sleeve expander utilizing only two annuli, one movable longitudinally toward the other;

FIG. 8 is an end elevation of another alternative embodiment of the invention suitable for use with a so-called "flat" cable, or the like; and FIG. 9 is a view showing how one of the sleeve expanders of FIG. 1 of the drawing may be utilized to permit an elastomeric sleeve to contract onto a piper or tubing, the sleeve in this case being a coupling, elbow branch, tee branch, or the like.

DESCRIPTION OF EXEMPLARY EMBODIMENTS OF INVENTION

Referring initially to FIG. 1 of the drawings, illustrated therein are two sleeve expanders 10 of the invention in use to progressively permit an elastomeric sleeve 12 to contract or shrink onto a cable splice 14 and onto adjacent portions of cables 16 on opposite sides of and interconnected by the splice. Initially, the two sleeve expanders 10 held the sleeve 12 expanded throughout its entire length to enable longitudinal movement of the sleeve expanders and the sleeve into position relative to the splice 14, with the central portion of the sleeve encompassing the splice. It will be understood that the assembly of the two sleeve expanders 10 and the sleeve 12 held against thereby was initially placed over one of the cables 10 and displaced longitudinally thereof to a location out of the way. After completion of the splice 14, the assembly of the sleeve expanders 10 and the expanded sleeve 12 were moved into a position relative to the splice wherein the central portion of the expanded sleeve encompassed the splice.

Referring now to FIGS. 1 to 6 of the drawings, each sleeve expander 10 comprises an outermost annulus 22, an intermediate annulus 24, and an innermost annulus 26. The three annuli 22, 24 and 26 carry longitudinally extending, circumferentially spaced, longitudinal supporting members or ribs 28 which maintain the sleeve 12 in its expanded condition, as best shown in FIG. 5 of the drawings. For convenience, the ribs 28 diverge radially inwardly and are carried in complementary, dovetail grooves 30 in the respective annuli 22, 24 and 26. However, it will be understood that various equivalents may be substituted for the relationship shown between the ribs 28 and the dovetail grooves 30. The longitudinal ribs 28 are maintained longitudinally stationary relative to the outermost annulus 22 by radially-inwardly-extending projections 32 thereon which abut the inner edge of the outermost annulus, as shown in FIG. 2 of the drawings. The intermediate annulus 24 and the innermost annulus 26 are longitudinally slidable along the ribs 28 toward the outermost annulus 22 to permit progressive contraction of the innermost ends of the ribs 28, and the expanded sleeve 12. To produce such longitudinal movement of the intermediate annulus 24 and the innermost annulus 26, an actuating means 34 is connected to the innermost annulus 26. Preferably, the actuating means 34 comprises simply a flexible loop or strap 36 having two ends 38 suitably connected to the innermost annulus 26 at laterally opposite points, as by looping the ends of the strap 36 around the innermost annulus and connecting same to the body of the strap in any suitable manner.

Initially, the innermost annulus 26 was positioned adjacent the innermost ends of the longitudinal ribs 28, so that the two sleeve expanders 10 maintained the sleeve 12 in a substantially cylindrical configuration throughout its entire length to permit longitudinal movement of the sleeve expanders and the sleeve into the desired position relative to the splice 14, as hereinbefore indicated. By pulling on the straps 36 of the two sleeve expanders 10 simultaneously, the innermost annulus 26 of each sleeve expander is displaced longitudinally toward the intermediate annulus 24. Upon engagement of the innermost annulus 26 with the intermediate annulus 24 of each sleeve expander 10, further pulling on the straps 36 displaces the innermost and intermediate annuli toward and ultimately into engagement with the projections 32 on the ribs 28. As this occurs, the longitudinal ribs 28 and the sleeve 12 progressively contact inwardly, as illustrated in FIGS. 1, 2 and 3 of the drawings. Ultimately, the two sleeve expanders 10 are pulled entirely out of the sleeve 12 to permit the sleeve to contact, with a shrink fit, onto the cable splice 14, and onto the cables 16 on opposite sides of and interconnected by the splice, as shown in FIG. 4 of the drawings.

Preferably, with the circular cross sectional configurations shown for the sleeve expanders 10, the sleeve 12, the splice 14 and the cables 16, the sleeve was initially expanded, in any suitable manner, and prior to insertion of the sleeve expanders 10 thereinto, to a diameter of at least twice its normal or contracted diameter. By expanding the sleeve to such an extent initially, the assembly of the sleeve expanders 10 and the sleeve 12 may readily be moved longitudinally onto one of the cables 16 prior to making the splice 14, and may thereafter be moved longitudinally into the desired position wherein the central portion of the expanded sleeve 12 encompasses the splice 14. It will be understood, of course, that initial expansion of the sleeve 12 to more than twice its normal diameter may be utilized, if desired, the amount of initial expansion being limited only by the ability of the sleeve to return to its initial diameter.

To permit removal of each sleeve expander 10 from the corresponding cable 16 after withdrawal from between the sleeve 12 and the corresponding cable, each of the annuli 22, 24 and 26 of each sleeve expander is made in at least two parts, as best shown in connection with the outermost annulus 22 in FIGS. 5 and 6 of the drawings. Referring particularly to these figures, the outermost annulus 22 is shown as formed in two halves 42 having suitable interlocking means 44 thereon, which interlocking means may have any desired construction. In the particular construction illustrated, the interlocking means 44 for interconnecting each pair of adjacent edges of the two annulus halves 42 comprise longitudinal ribs 46 receivable in complementary grooves 48. More particularly, the interlocking means 44 for connecting each pair of adjacent edges of the two annulus halves 42 together comprises oppositely facing ribs 46 on each of the halves 42 and oppositely facing grooves 48 in each of the halves.

A feature of the invention is that the sleeve 12 may be bonded to the splice 14 and the cables 16, upon contraction of the sleeve onto such elements, by means of any suitable bonding agent or agents applied, before contraction of the sleeve, to the interior of the sleeve and/or the exterior of the splice 14 and the cables 16. Thus, the weatherproofing of the splice 14 which is achieved by shrinking the sleeve 12 onto the splice 14 and the cables 16, may be supplemented by bonding of the sleeve to the splice and cables.

While the invention has been shown in FIGS. 1 to 6 of the drawings as applied to a sleeve 12 of such length as to require two of the sleeve expanders 10, it will be understood that, where a shorter sleeve may be utilized, only one of the sleeve expanders 10 is needed. The operation is essentially the same, except that the sleeve maintained expanded by the single sleeve expander 10 is longitudinally centered over the desired point on the member onto which the sleeve is to be contracted. For example, if only a small overlap of the cables 16 on opposite sides of the splice 14 is desired, a shorter sleeve carried by only one of the sleeve expanders 10 may be utilized, and such shorter sleeve is longitudinally centered over the splice 14 before withdrawal of the single sleeve expander 10. Such a shorter sleeve progressively contracts onto the splice 14 and the cables 16 on opposite sides thereof in essentially the same manner as hereinbefore described.

Also, as indicated previously herein, the number of annuli may be varied, depending on the length of the expander. The sleeve expanders 10 were shown as utilizing the three annuli 22, 24 and 26, with the intermediate and innermost annuli 24 and 26 movable longitudinally toward the outermost annulus 22. In an extremely long installation, additional intermediate annuli, corresponding to the intermediate annulus 24, may be utilized, such additional intermediate annuli being free to move longitudinally in the same manner as the intermediate annulus 24.

For a short installation, the intermediate annulus 24 may be omitted, the longitudinal ribs 28 being supported only by the outermost annulus 22 and the innermost annulus 26. Such a sleeve expander is shown in FIG. 7 of the drawings and is designated generally by the numeral 50. Since the sleeve expander 50 is identical to one of the sleeve expanders 10, except for the omission of the intermediate annulus 24 and corresponding shortening of the longitudinal ribs 28, the same reference numerals are utilized in FIG. 7 as were utilized in FIGS. 1 to 6.

The sleeve expanders 10 and 50 have been described as of circular cross section for use with sleeves to be shrunk onto elements of circular cross section. However, the invention is not limited to any particular cross sectional configuration, the cross sectional configuration of the sleeve expander of the invention being variable from circular to square to oval, or the like, depending on the cross sectional configuration of the member upon which a sleeve is to be shrunk. For example, FIG. 8 shows a sleeve expander 60 having an oval cross section, for application of a sleeve, not shown to a so-called "flat" cable, not shown. In all other respects, the structure of the sleeve expander 60 may be identical to the sleeve expander 10, or the sleeve expander 50, so that a further description is not necessary.

As shown in FIG. 9, the sleeve expander 10 (or the sleeve expander 50) may be utilized to shrink an outer tubular member 70 onto an inner tubular member 72. For example, the outer tubular member 70 may be a coupling utilized to interconnect adjacent pipe or tubing ends. Alternatively, the outer tubular member 70 may be an elbow branch, a tee branch, or the like, contractible onto a tubing end represented by the inner tubular member 72. Also, the invention may be used to shrink an end cap onto any desired member.

More generally, it will be understood that the present invention may be utilized wherever it is desried to contract a resilient sleeve, or the like, onto a member therewithin.

It will be understood that while a constant diameter sleeve has been shown, a molded elastomeric sleeve having differing lateral dimensions lengthwise thereof can be applied to a complementary member therein by utilizing a plurality of sleeve expanders of correspondingly different lateral dimensions.

Although exemplary embodiments of the invention have been disclosed for illustrative purposes, it will be understood that various changes, modifications and substitutions may be incorporated in such embodiments without departing from the invention as hereinafter claimed.

I claim as my invention:

1. In a device for maintaining a latrally expanded resilient sleeve, or the like, in a laterally expanded condition, and for progressively permitting the sleeve to contract onto a member therewithin, the sleeve to contract onto a member therewithin, the combination of:
   a. a first, outer annulus positionable adjacent one end of the sleeve in alignment therewith;
   b. a second, inner annulus aligned with said first annulus and positionable relative to the sleeve at a location spaced inwardly of the sleeve with respect to said one end of the sleeve;
   c. a laterally contractible arrangement of longitudinal members carried by said first annulus and supported in a laterally expanded condition by engagement thereof with said second annulus and positionable within the sleeve;
   d. said second annulus being movable toward said first annulus to permit said arrangement of longitudinal members to progressively contract laterally, thereby allowing the sleeve to progressively contract onto the member therewithin; and
   e. actuating means connected to said second annulus for displacing it longitudinally toward said first annulus.

2. A device according to claim 1 wherein said annuli are circular.

3. A device as defined in claim 1 wherein said annuli have a lateral dimension greater than another lateral dimension thereof.

4. A device according to claim 1 wherein each of said annuli is separable into at least two parts to facilitate removal of said annuli from a member onto which the sleeve has been contracted.

5. A device as defined in claim 1 wherein said acutating means comprises a flexible loop connected at laterally opposite points to said second annulus.

6. A device according to claim 1 wherein said longitudinal members are provided with stops abutting said first annulus to prevent movement of said longitudinal members relative to said first annulus as said second annulus is displaced toward said first annulus.

7. A device as defined in claim 1 wherein said longitudinal members are disposed in and project from external longitudinal grooves in said annuli.

* * * * *

UNITED STATES PATENT AND TRADEMARK OFFICE
CERTIFICATE OF CORRECTION

PATENT NO. : 3,946,480
DATED : March 13, 1976
INVENTOR(S) : Zoltan B. Dienes

It is certified that error appears in the above-identified patent and that said Letters Patent are hereby corrected as shown below:

Col. 1, line 23, "contact" should be --contract--;

Col. 2, line 28, "of"(first occurrence) should be --to--;

Col. 2, line 38, "impportant" should be --important--;

Col. 2, line 46, delete "the" before "engagement";

Col. 3, line 12, "sixe" should be --size--;

Col. 4, line 12, "piper" should be --pipe--;

Col. 4, line 31, "against" should be --expanded--;

Col. 5, line 20, "contact" should be --contract--;

Col. 5, line 23, "contact" should be --contract--;

Col. 7, line 5, "desried" should be --desired--;

Col. 7, line 21, "maintaing" should be --maintaining--;

Col. 7, line 21, "latrally" should be --laterally--; and

Col. 7, lines 24-25, delete "the sleeve to contract onto a member therewithin,".

Signed and Sealed this

Fourteenth Day of September 1976

[SEAL]

Attest:

RUTH C. MASON
*Attesting Officer*

C. MARSHALL DANN
*Commissioner of Patents and Trademarks*